Patented Nov. 14, 1950

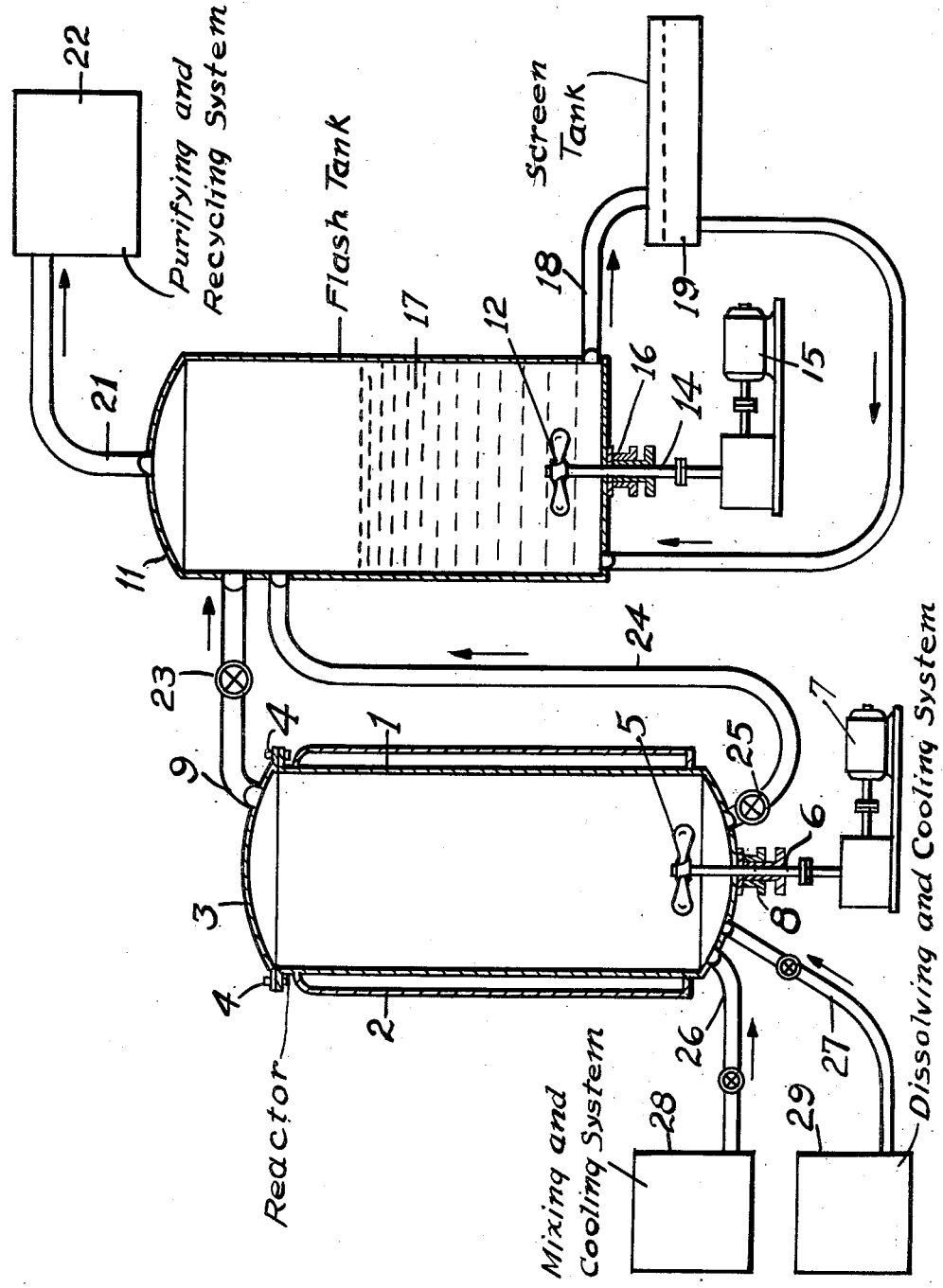

2,530,145

UNITED STATES PATENT OFFICE 2,530,145

PROCESS FOR EMPTYING BUTYL RUBBER REACTOR

Robert W. Benoliel, Menlo Park, Calif., and Bryan W. Flanagan, Baton Rouge, La., assignors to Standard Oil Development Company, a corporation of Delaware Application September 23, 1948, Serial No. 50,848

7 Claims. (Cl. 260—85.3)

1

This invention relates to polymerization processes; relates particularly to methods for cleaning polymerization reactors; and relates specifically to cleaning processes utilizing warm feed to solvate adherent polymer thereby rendering it less viscous so that when the liquid level in the reactor is lowered the solvated polymer will flow off the walls of the reactor.

It has been found possible to produce a very valuable synthetic polymer, elastomeric in character, which is an excellent replacement for rubber (caoutchouc) by the steps of mixing together a major portion of isobutylene with a minor proportion of butadiene or other multi-olefin having from 4 to 14 inclusive, carbon atoms per molecule, cooling the mixture to a temperature within the range between about $-40°$ C. and $-103°$ C. to $-164°$ C. and polymerizing the cooled mixture by the application of a Friedel-Crafts catalyst, preferably in solution in a low-freezing non-complex forming solvent. This reaction is preferably conducted in a continuous process; streams of cold unsaturate or olefinic material, preferably containing an appropriate diluent; and catalyst solution being delivered to the reactor and an overflow of solid polymer slurried in the unsaturate or olefin and diluent being taken from the top of the reactor and delivered to a flash tank containing a substantial quantity of warm water which drives off un-polymerized olefins or unsaturate and diluent, leaving a slurry of solid polymer in water. The reaction proceeds smoothly and readily to produce an excellent elastomer. It is, however, further necessary to apply a refrigerating jacket to the reactor, the jacket being filled with an appropriate refrigerant. Liquid ethylene is the preferable refrigerant but many other refrigerants are available as will be obvious to those skilled in the art.

Difficulty is however encountered from the accumulation of adherent polymer on the interior of the reactor on the surfaces of the refrigerating jacket which interferes seriously with the transfer of the heat of reaction from the reactant liquid to the refrigerant in the jacket; and when the layer of adherent polymer reaches an average thickness such that the temperature gradient between the reactant liquid and the refrigerant is greater than $8°$ to $12°$ or $15°$ C., the low temperature of the reactants necessary for formation of elastomer of desired properties is not obtained, and the interior of the reactor must be cleaned to remove the coating of adherent polymer. This layer is comparatively thin, a fraction of an inch, but is very strongly adherent to the interior metal surfaces of the reactor. It is impractical to scrape the inside of a reactor because of the very great number of man-hours involved. Attempts have been made to dissolve the layer in a wide range of solvents, but the high molecular weight of the polymer causes solutions of the polymer in solvents to be extremely viscous, requiring prohibitive amounts of solvents for washing.

It has been found that by the steps of discontinuing the supply of refrigerant and catalyst solution, and delivering to the reactor a stream of warm olefinic-diluent feed, the contents of the reactor can be brought up to a temperature considerably above polymerization temperature and the polymer adherent to the interior walls of the reactor solvates and becomes soft by virtue of absorbing monomeric olefin from the warm olefinic-diluent feed. As the temperature is increased, the valve on the overflow from the reactor may be partly closed to restrict the outflow of liquid and prevent vaporization of the liquid feed (this pressure ranging from 10 pounds to 100 pounds per square inch).

When the reactor has been filled with warm feed, and the previously present cold slurry displaced, the major portion of the particles of solid slurry have been discharged through the overflow. The overflow valve may then be nearly or fully closed and a bottom outlet valve leading to the same flash tank, opened. The vapor pressure of the warm feed is then available to force the reactor contents through the bottom outlet valve to the flash tank. It has been settled by painful experience that the reactor contents at low temperature cannot be discharged through a pipe of any substantial length since the solid polymer is so viscous and sticky at polymerization temperatures that it clogs any but the shortest, largest pipes. As indicated, however, in carrying out the successive steps above, the warm olefinic-diluent feed has warmed and solvated the solid polymer, greatly reducing its viscosity. In this condition the polymer is readily forced through a relatively small, long bottom outlet pipe.

In carrying out the steps indicated above the solvating not only occurs with regard to the polymer particles in the slurry, but also with regard to the polymer adherent to the reactor walls. The unexpected phenomenon then occurs that the reduction in viscosity (probably enhanced by an increase in mass of the polymer) causes the solvated polymer to flow off the walls of the reactor as the level of the warm feed lowers, leaving a nearly clean wall surface.

Apparently the (larger) difference between the density of the solvated polymer layer and the vapor in the reactor is sufficient that the polymer flows down off the walls while with the (lesser) difference between the density of the solvated polymer and the liquid reactor contents is not sufficient to cause the polymer to be buoyed up and flow upward off the reactor walls.

The reactor may be fully cleared of warm feed and solvated polymer by the procedure above described, then recooled by readmitting refrigerant into the jacket and a fresh charge of cold olefinic material and diluent delivered to the reactor, the stream of catalyst solution being started when the reactor is full of reactant at the necessary low temperature.

The invention thus cleans a semi-continuous, olefinic, polymerization reactor by the steps of discontinuing catalyst supply and refrigerant supply, delivering to the cold reactor a stream of warm olefinic-diluent feed, throttling the reactor outlet to prevent vaporization within the reactor as the temperature rises, followed by the discharge of the material through a bottom outlet, utilizing the solvating power of the warm feed on the solid polymer to reduce its viscosity, thereby preventing plugging of the discharge outlet and simultaneously causing solvated adherent polymer to flow down off the reactor walls as the pressure forces the reactor contents out through the bottom outlet, thereby clearing the heat transfer surface preparatory to reuse. Other objects and details will be apparent from the following description, when read in connection with the accompanying drawing wherein:

The single figure is a diagrammatic representation of a reactor equipped for the practice of the present invention.

In practicing the invention a continuous type of polymer reactor may be utilized as shown in U. S. Patents Nos. 2,399,672, 2,401,754; and U. S. applications Serial Nos. 511,699 (now U. S. Patent 2,463,866), 448,575 (now abandoned), and 545,099.

As shown in these patents and applications, and in the figure of the present drawing there is provided a reactor member 1 having thereon a refrigerating jacket 2. The cover 3 is held in place by bolts 4 and a stirring propeller 5 mounted upon shaft 6 driven by a source of power 7 is provided. The shaft 6 passes through a packing gland 8 to prevent leakage from the reactor. An overflow pipe 9 is provided leading to a flash tank 11. The flash tank 11 likewise is provided with a stirrer 12 mounted upon a shaft 14 driven by a second source of power 15. The shaft 14 likewise conveniently passes through a packing gland 16. The flash tank 11 is partly filled with warm water 17 and a bottom discharge 18 is provided leading to a screen member 19 upon which the solid polymer is recovered and the separated water prepared for return to the flash tank 11. An outlet pipe 21 is likewise provided from the flash tank 11 for the delivery of volatilized components to a purifying and recycling system 22. A valve member 23 is provided on the overflow pipe 9; and a second discharge pipe 24 with a valve member 25, is provided at the bottom of the reactor, the pipe 24 also leading to the flash tank 11. A supply pipe 26 for reactant material and a supply pipe 27 for catalyst solution are likewise provided. The reactant material is delivered to the pipe 26 from a mixing and cooling system 28; and a cold catalyst solution is delivered to the pipe 27 from a dissolving and cooling system 29.

In the operation of the polymerization process to which this invention is a useful addition an olefinic mixture is prepared consisting primarily of isobutylene with an admixture of multi olefin or multi-unsaturate. The umlti olefin may be any unsaturated hydrocarbon having from 4 to 14 carbon atoms per molecule. Representative substances are butadiene conjugated diolefins of 4 to 6 carbon atoms, such as, isoprene, piperylene, dimethyl butadiene, as well as dimethallyl, myrcene, alloocymene, 2-methyl 3-nonyl butadiene-1,3; or 2-methyl 4-nonyl butadiene-1,3; or 3 decyl butadiene-1,3; or 2 methyl, 3-actyl butadiene-1,3; or 2 methyl, 3 heptyl, butadiene-1,3; or 2 methyl, 3-hexyl butadiene-1,3; and the like. It may be noted that the multi-olefinic component may be conjugated or not as desired. Preferred multi-olefins have a methyl group in the 2-position, and any convenient substituent in the 3 or 4-position; but this configuration is not necessary since simple butadiene is an excellent copolymerizate, as is also piperylene, neither of which have substituents in the 2-position. Present knowledge indicates ethat any unsaturated compound having 2 or more double linkages is more or less useful; including all of the multiply unsaturated organic compounds; both hydrocarbons, ethers and the like.

The mixture, for making elastomers, preferably contains a major proportion of isobutylene but this is not essential, especially with butadiene from which a good elastomer is obtained with amounts of butadiene in the polymerizate mixture as high as 85% (although it may be noted that even in such mixtures a major proportion of isobutylene is copolymerized into the resulting polymer).

(It may also be noted that this process is applicable primarily to the making of elastomers in which the finished polymer contains a major portion of isobutylene to yield a high quality elastomer. The process is however equally applicable to the making of a copolymer of isobutylene and styrene; and to a resinous polymer containing a major proportion of the multi-olefin prepared at temperatures ranging from about —35° C. to +15° C.)

The mixed olefins may be used as such in the continuous reactor. Usually however it is preferable to dilute them with an appropriate diluent. The commercially preferred diluent is methyl chloride. An even better diluent is methylene chloride. Other excellent diluents are ethyl chloride, ethylene chloride, chloroform, carbon disulfide, and the like, all halogen substituted organic compounds having freezing points below the polymerization temperature being more or less satisfactorily usable (the fluorides and fluoro-chlorides having up to about 6 carbon atoms are highly satisfactory). The straight chlorides up to about 4 carbon atoms also are very satisfactory, although special precautions are sometimes required to avoid hydrolysis when the 3 and 4 carbon atom compounds are used. The low freezing hydrocarbons are also highly satisfactory diluents including such substances as liquid ethylene, liquid ethane, liquid propane, butane, pentane, light naphthas and so forth. It may be noted that oxygenated compounds destroy the catalyst activity and are therefore unusable.

The catalyst may be any of the Friedel-Crafts active metal halides disclosed by N. O. Calloway in his article on the "Friedel-Crafts Synthesis" printed in the issue of "Chemical reviews" published for the American Chemical Society at Baltimore in 1935, in volume XVII, No. 3, the article beginning on page 327, the list being particularly well shown on page 375. The preferred catalyst substance is aluminum chloride, in solution in an appropriate solvent such as ethyl or methyl chloride or methylene chloride. Alternatively boron trifluoride in solution in an appropriate solvent is just about as satisfactory. If a hydrocarbon solvent is to be used, aluminum chloro-bromide is equally satisfactory, with the other substances usable in varying degrees of satisfactoriness, depending upon the multi-olefin in the polymerizate mixture.

In most instances it is essential that the catalyst be in fluid form, and usually it is preferable to have the catalyst in liquid form. The solid catalysts appear to be wholly ineffective for this polymerization reaction, perhaps because each solid particle forms a thin layer of polyer around itself which prevents solution and prevents further polymerization.

For the catalyst solvent it is essential that it be a low freezing non-complex forming solvent. To be low freezing it is merely necessary that the catalyst solvent have a freezing point below 0° C. It should be noted that it is not necessary that the catalyst have a freezing point below the polymerization temperature (although such is a manufacturing convenience) since the catalyst solution may be made up at any desired temperature above the solvent freezing point and then either sprayed onto the cool olefinic material or jetted into the olefinic material. In either instance the solvent dissolves in the olefinic material before it freezes and the catalyst is left in active condition. To be non-complex forming it is merely necessary that there shall not separate from solution, upon the evaporation of the solvent a compound between the solvent and the active metal halide substance having a markedly different boiling or decomposition temperature; or that the addition of the solvent in the form of a vapor to the active metal halide substance at constant temperature will lead to a substantially continuous change in the composition of the catalyst phase, and to a continuous increase in the pressure of the solvent; and in general that the active metal halide can be recovered unchanged by evaporation of the solvent.

The catalyst solution is most conveniently prepared by mixing together the solvent and the solid metal halide, at a temperature below the boiling point of the solvent, dissolving as much as is conveniently possible, settling out any undissolved particles and diluting the resultant solution to the desired concentration. It may be noted that with aluminum chloride in methyl chloride a desirable concentration is from 0.1% to about 2.5% (saturation being in the neighborhood of 5%). It may be noted that it is not possible to indicate the amount of catalyst required for the production of any given amount of co-polymer since in any event a large portion of the catalyst is inactivated by traces of impurities. However, as a rule with reactants of good purity 1 gram of dissolved aluminum chloride will produce from 100 to 1800 grams of co-polymer. In some instances with reactants from which other unsaturates, especially butene-1 and butene-2 have been entirely removed, and also oxygen compounds are absent, very much higher yields of polymer may be obtained; and in other instances the presence of small amounts of impurities may reduce the yield to very much lower values. Accordingly each worker in the art finds it preferable to add catalyst solution until the desired amount of polymerization has occurred since this avoids the necessity for a difficult and time consuming analysis.

The resulting polymer usually has a Staudinger molecular weight number within the range between 30,000 and 90,000; the preferred range lying between about 38,000 and 48,000. The polymer also has an iodine number (by the Wijs' method) within the range between about 1 and 10 although iodine numbers as high as 50 or 60 are occasionally desirable. The polymer is reactive with sulphur especially in the presence of an accelerator, such as tetramethylthiuram disulfide, to yield a cured polymer having a tensile strength within the range between 1200 pounds and 4500 pounds per square inch, with an elongation at break within the range between 500% and 1200%; depending on the character and amount of fillers, pigments and the like.

In practicing the process the desired mixture of isobutylene and multi-olefin is prepared, cooled to the desired temperature and delivered to the reactor 1, which has in the meantime been cooled to reaction temperature by refrigerant in the jacket 2. When the reactor is full, a stream of catalyst solution is started through the supply pipe 27 and the stirrer 5 put into operation. The continuing streams of cooled olefinic material, usually including a diluent, and the catalyst solution cause the reactor to overflow through the outlet pipe 9, and as the polymerization proceeds a substantial amount of solid polymer is carried over with the discharged liquid through the pipe 9. Under equilibrium conditions the amount of solid polymer ranges between about 7% and about 20%, more than about 20% being difficult to handle because of a tendency to clog the overflow 9 no matter how short and wide it is. The stream of cooled overflow slurry is then caught in the warm water 17 by which the diluent and unpolymerized olefins are volatilized and sent through the outlet pipe 21 to the recovery system 22; and the slurry of polymer in water is drained through the pipe 18 to the screen 19 from which the warm water is returned to the tank 17. This procedure may be continued for a time interval ranging from 10 to 200 hours.

During this time interval, a small amount of polymer is formed in immediate contact with the walls of the reactor 1 and adheres thereto. The amount is small, but the coating of adherent polymer builds up slowly and interferes seriously with the transfer of the heat of reaction from the reactor liquid to the refrigerant in the jacket; eventually reaching such a thickness as to prevent the necessary rate of heat transfer to maintain efficient operation of the reactor.

When this point is reached, it is necessary to clean the reactor. According to the present invention, when this stage is reached, the flow of catalyst solution through the pipe 27 is arrested by an appropriate valve as shown. The refrigerating means in the mixing and cooling system 28 is then shut down and the olefins and feed are mixed at atmospheric temperature, or slightly above and the supply of mixed olefins and diluent, conveniently in the same proportion, is sent through the pipe 26 to the reactor at atmospheric temperature or slightly above. The warm feed may have a temperature within the range from about −30° C. to about +40° C. depending upon the character of the feed and the available mixing, pumping and heating equipment. The warm feed displaces portions of cooled feed through the outlet 9, carrying with it substantial amounts of slurried polymer; the temperature of the contents of the reactor being raised gradually by the introduced heat in the warm feed. Simultaneously of course the refrigerant is drained from the refrigerating jacket 2, to prevent delay in the warming up.

The displacement of cool slurry through the pipe 9 effects a recovery of most of the solid polymer in the reactor, in normal course of procedure, and since only normal feed is sent to the reactor, the effluent gases in the pipe 21 to the recycling system 22 varies from normal only by the presence of an extra amount of unpolymerized olefins, thereby imposing no unexpected load upon the recycling equipment and effecting no change in equilibrium conditions therein. As the warm feed is deliverd, the contents of the reactor (which in the commercial reactor may amount to about 7 tons) is gradually raised in temperature and after a time interval of from 1 to 3 hours, the entire contents of the reactor may be at a temperature at or above the mixed atmospheric boiling point of the material. When this temperature is reached, the valve 23 may be partly closed to such an extent as to prevent vaporization of the warmed liquid in the reactor. As the temperature continues to rise, the valve 23 may be brought more nearly shut so as to maintain the reactor substantialy full of liquid conveniently until a temperature at which the liquid has a considerable vapor pressure is reached. This temperature preferably is sufficiently high to develop in the reactor a pressure within the range between about 10 and 80 pounds per square inch.

This elevated temperature results in a solvation of the particles of polymer in the slurry by the olefinic feed liquid which converts them from a very viscous, sticky condition to a bulkier, much less viscous condition. Very little of the particles dissolve, but the absorption of from 1 to 8 or 10 volumes of solvent greatly increases the bulk and decreases the stiffness and solidity so that the particles approach a semi-fluid condition such as to flow through pipes quite readily; and a similar change occurs with the adherent polymer on the reactor walls.

When the desired temperature and pressure are reached, the valve 25 is opened (and the valve 23 closed entirely, if desired). At this point the supply of warm feed is preferably discontinued. The pressure in the reactor then conveniently forces the reactor contents out through the pipe 24 into the flash tank 11 and any question of clogging or plugging of the pipe 24 is avoided due to the low voscosity of the solvated polymer.

As the level of the liquid in the reactor lowers, the polymer adherent to the inner walls is exposed to gas rather than to liquid of about the same density, and because of the difference between the density of the solvated polymer and the vapor in the reactor, the polymer on the walls flows down off the reactor walls into the residual warm feed in the reactor. By the time the reactor is fully drained, practically all of the polymer has flowed off the walls and out of the reactor through the bottom outlet pipe.

From this stage on any one of several procedures may be practiced. In some instances it may be considered that no further cleaning of the reactor is necessary and accordingly a supply of fresh cold feed may be delivered to the reactor, the jacket filled with liquid refrigerant and when the reactor is full and the proper low temperature reached the supply of catalyst may be started and the polymerization resumed in the usual manner.

It may be considered desirable, however, to remove from the reactor walls the small amount of remaining adherent polymer and accordingly it is frequently desirable to rinse the emptied reactor with portions of some other solvent. For this purpose a light naphtha may be used. Commercial experience indicates that a rinse with light naphtha after each cleaning operation is advantageous since it keeps the reactor thoroughly clean and gives a maximum length of run which is not otherwise obtainable merely by the simple solvation and draining. Accordingly, the reactor may be filled with a charge of light naphtha from a convenient tank at a relatively high temperature, such as close to atmospheric temperature; the reactor and its contained naphtha charge being agitated by stirrer 5 for a length of time varying from 15 minutes to an hour, after which the reactor is drained of naphtha to the spent naphtha receiver, and then the filling with fresh feed carried out and polymerization resumed. By this procedure there is obtained a very thoroughly cleaned reactor.

Alternatively, the naphtha cleaning may be applied only after a limited number of the cleaning operations, several successive cleanings by the simple treatment with warm feed being applied in succession, then a thorough washing with a small amount of naphtha solvent being used.

The operation of a continuous polymerization system of the present type over a period of several years has shown that the reactor time "on stream" will vary from 20 to 60 hours during which time a layer of adherent polymer gradually accumulates in the interior of the reactor; and commercial practice has developed the custom of carrying the reaction through for approximately 24 hours, at which time the reactor is taken off stream for cleaning regardless of the thickness of polymer, since it is found that by frequent cleaning a better operation is maintained and a higher grade of polymer produced, better polymer being made if the reaction is not continued for the maximum length of time. This procedure was found to be effective in view of the fact that previous reactor cleaning methods consumed from 11 to 16 hours, and with two reactors running and one reactor down for cleaning, a reasonable time schedule for the cleaning operation could be obtained. It was found also that prior reactor cleaning methods such as displacement of reactor contents with warm naphtha and the like, involve the loss by degradation of approximately 2400 pounds of polymer for each cleaning cycle. Naphtha washing of the reactor to clean it was found to involve about 4500 gallons per reactor per cleaning. The loss of rubber and the large amount of naphtha required were serious commercial handicaps, since both involve considerable costly losses.

In sharp contrast with this situation, it is found that the present reactor cleaning procedure can be conducted in approximately six hours or slightly more, but usually 8 to 9 hours are available, and a far better and more effective cleaning is obtained than by the previous procedure. Likewise, the loss of polymer by degradation from the cleaning procedure of the present invention is usually well under 200 lbs. and the amount of naphtha supply required for cleaning is less than 1,000 gallons per reactor cleaned. Accordingly a very substantial and valuable saving in reactor cleaning has been obtained.

Thus the process of the invention washes a low temperature polymerization reactor with warm olefin-diolefin diluent feed to solvate residual and adherent polymer, to prevent clogging of discharged lines; to cause adherent polymer to flow off the reactor walls under its own weight as the reactor is emptied of liquid and to discharge the solvated polymer and reactor contents conveniently through utilization of the vapor pressure of the warm feed to yield a clean reactor having a high heat transfer rate through the walls.

While there are above disclosed a limited number of embodiments of the invention it is possible to produce still other embodiments without departing from the inventive concept wherein disclosed and it is therefore desired that only such limitations be imposed on the appended claims as are stated therein or required by the prior art.

The invention claimed is:

1. In a low temperature polymerization process for the production of elastomers wherein a cold olefinic feed mixture of isobutylene and a multiolefin of 4 to 14 carbon atoms is fed into a closed reaction zone at a temperature between −40° C. and −164° C. and polymerized by the application to the feed mixture of a stream of a Friedel-Crafts catalyst in solution in a low freezing non-complex forming solvent so as to form a cold slurry of polymer particles in unpolymerized feed, which polymer slurry is withdrawn from the reaction zone, the improvement which comprises cutting off the catalyst stream when the walls of the reaction zone become undesirably coated with a film of polymer, withdrawing the cold polymer slurry from the reaction zone and introducing into said zone the feed mixture at a temperature between −30° C. and +40° C., maintaining the reaction zone substantially filled with the warm feed mixture under a pressure within the range between 10 and 80 pounds per square inch until the adherent polymer is solvated, and forcing a liquid stream of warm feed mixture including the solvated polymer from a bottom portion of the reaction zone under the developed pressure.

2. A process according to claim 1 wherein the warm feed mixture raises the contents of the reaction zone to a temperature above their mixed atmospheric boiling point.

3. In combination with a low temperature polymerization process for the production of elastomers wherein an olefinic feed mixture comprising a major proportion of isobutylene and a minor proportion of a conjugated diolefin of 4 to 6 carbon atoms is fed continuously into a closed reaction zone and there polymerized at a temperature between −40° C. and −164° C. by the application thereto of a stream of a Friedel-Crafts catalyst in solution in a low freezing non-complex forming solvent and the resulting reaction mixture containing a cold slurry of polymer particles in the unpolymerized feed mixture is continuously withdrawn as an overflowing liquid stream from the reaction zone, the improvement which comprises cutting off the catalyst stream when the walls of the reaction zone become undesirably coated with a film of adherent polymer, displacing the residual cold polymer slurry overhead from the reaction zone with relatively warm olefinic feed mixture having a temperature between −30° C. and +40° C. whereby the temperature of the entire contents of the reaction zone is gradually raised, maintaining the reaction zone substantially filled with the warm feed mixture under a pressure within the range between 10 and 80 pounds per square inch until the adherent polymer is solvated, and forcing the warm liquid feed, including the solvated polymer, downwardly out of a bottom portion of the reaction zone under the developed pressure.

4. In combination with a low temperature polymerization process for the production of elastomers wherein an olefinic feed mixture comprising a major proportion of isobutylene and a minor proportion of a conjugated diolefin of 4 to 6 carbon atoms is fed continuously into a closed reaction zone and there polymerized at a temperature between −40° C. and −164° C. by the application thereto of a stream of a Friedel-Crafts catalyst in solution in a low freezing non-complex forming solvent and the resulting slurry of polymer particles in unreacted feed mixture is continuously withdrawn as an overflowing stream from an upper portion of the reaction zone and discharged into a warm water bath within a flashing zone, the improvement which comprises cutting off the catalyst stream when the walls of the reaction zone become undesirably coated with adherent polymer, feeding relatively warm olefinic feed mixture having a temperature between −30° C. and +40° C. into the reaction zone whereby the temperature of its entire contents is gradually raised, withdrawing the contents of the reaction zone containing residual slurried polymer as an overflowing liquid stream from the reaction zone to the flashing zone, later restricting the overflowing stream to prevent vaporization within the reaction zone, maintaining the reaction zone substantially filled with the warm feed mixture under a pressure within the range between 10 and 80 pounds per square inch until the adherent polymer is solvated, shutting off the feed supply, emptying the reaction zone by draining the warm feed containing the solvated polymer from a bottom portion of the reaction zone under the developed pressure, and delivering the drained feed and polymer under pressure to the aforesaid flashing zone for recovery.

5. A process according to claim 4 wherein the polymerization catalyst is a solution of aluminum chloride in an alkyl chloride of 1 to 2 carbon atoms.

6. A process according to claim 4 wherein the warm feed mixture has a temperature of about +40° C.

7. A process according to claim 4 which, after draining out the warm feed from the reaction zone, contains the additional steps of refilling the reaction zone with fresh cold feed, delivering catalyst to the fresh feed and conducting the reaction until another layer of adherent polymer is formed on the walls of the reaction zone, repeating such cycles of alternate polymerizing of cold feed and washing with warm feed a number of times, and at the end of a series of such cycles rinsing the reaction zone with a portion of warm solvent naphtha.

ROBERT W. BENOLIEL.
BRYAN W. FLANAGAN.

REFERENCES CITED

The following references are of record in the file of this patent:

UNITED STATES PATENTS

| Number | Name | Date |
|---|---|---|
| 2,378,138 | Gaylor | June 12, 1945 |
| 2,455,665 | Ford et al. | Dec. 7, 1948 |